United States Patent [19]

Wolgemuth

[11] 4,223,109
[45] Sep. 16, 1980

[54] CALCIUM SALTS OF DIVINYL ETHER—MALEIC ANHYDRIDE COPOLYMER

[75] Inventor: Richard L. Wolgemuth, Plain City, Ohio

[73] Assignee: Adria Laboratories Inc., Columbus, Ohio

[21] Appl. No.: 13,936

[22] Filed: Feb. 22, 1979

[51] Int. Cl.$^2$ .................................. C08F 222/06
[52] U.S. Cl. ...................... 525/327; 260/DIG. 47; 424/78; 526/271
[58] Field of Search ............... 260/DIG. 47; 526/15; 424/78

[56] References Cited

U.S. PATENT DOCUMENTS

| | | | |
|---|---|---|---|
| 3,224,943 | 12/1965 | Espy | 424/78 |
| 3,624,218 | 11/1971 | Regelson | 424/78 |
| 3,794,622 | 2/1974 | Breslow | 424/78 |
| 3,859,433 | 1/1975 | Regelson | 424/78 |

Primary Examiner—Stanford M. Levin
Attorney, Agent, or Firm—Marion C. Staves

[57] ABSTRACT

The calcium salts of the solid cyclic copolymers of divinyl ether and maleic anhydride, soluble in water, have been found to be as effective in treating tumors and viruses as the prior art alkali metal salts (e.g., the sodium salt) but much less toxic. These copolymers are characterized by containing divinyl ether and maleic anhydride in a mole ratio of about 1:2, having a molecular weight of from about 2000 to about 100,000 and from about 5% to about 70% of its carboxylic acid groups converted to calcium salts.

2 Claims, 1 Drawing Figure

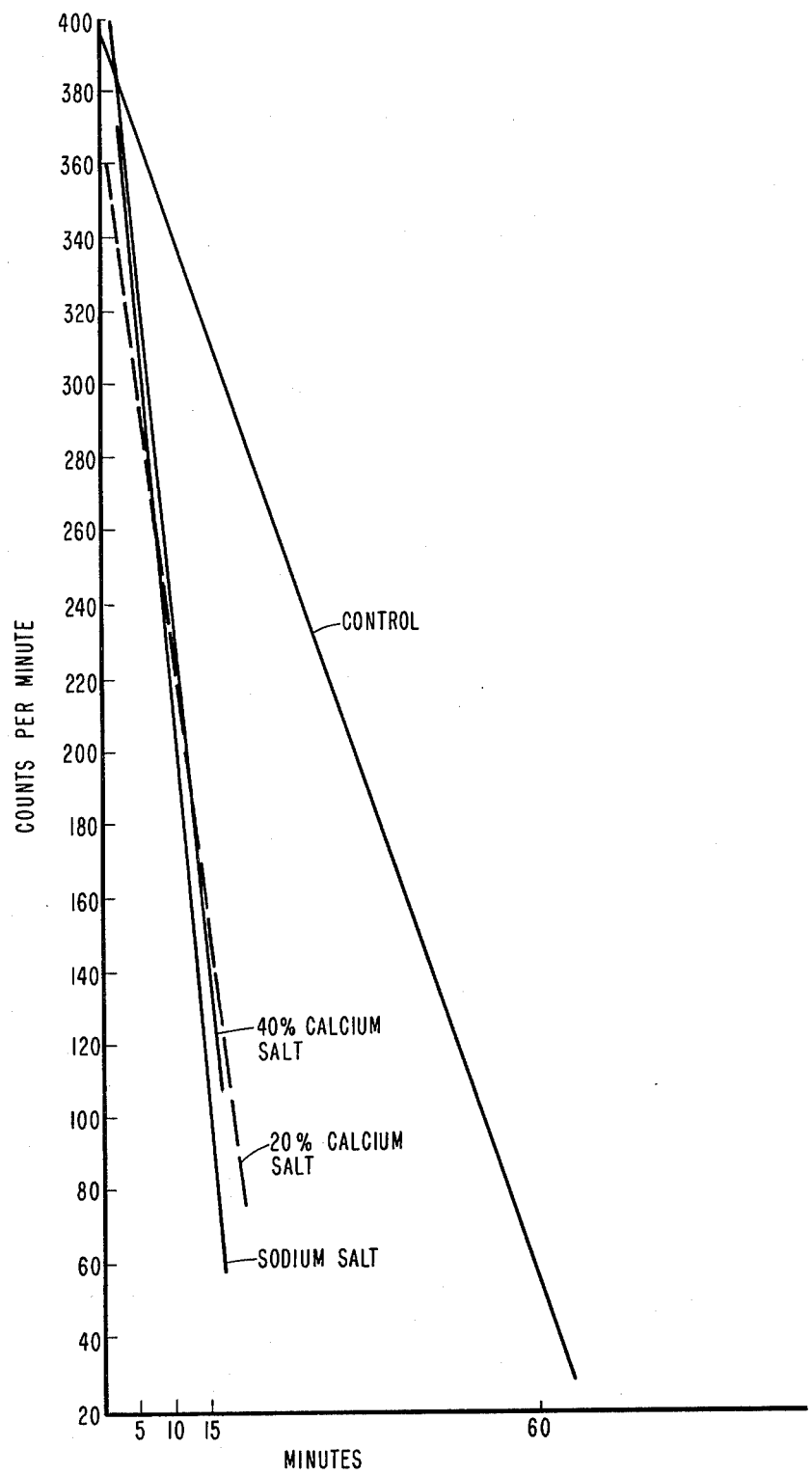

CALCIUM SALTS OF DIVINYL ETHER—MALEIC ANHYDRIDE COPOLYMER

This invention relates to the calcium salts of the cyclic copolymers of divinyl ether and maleic anhydride.

Copolymers of divinyl ether and maleic anhydride are well known in the art and have been described as retarding the growth of certain malignant tumors in U.S. Pat. No. 3,224,943, issued Dec. 21, 1965; in treating foot-and-mouth disease virus in U.S. Pat. No. 3,624,218, issued Nov. 30, 1971; and other antiviral treatment in U.S. Pat. No. 3,859,433, issued Jan. 7, 1975. U.S. Pat. No. 3,794,622, issued Feb. 26, 1974, recognized certain undesirable side effects, e.g., high acute toxicity, of the prior art divinyl ether—maleic anhydride copolymers and disclosed that copolymers in a narrow range of molecular weight (i.e., about 5000 to about 30,000) and having a narrow molcular weight distribution (i.e., an Mw/Mn ratio of from about 1.0 to about 3.0) are superior to the broad copolymer mixtures described in the prior art in being less toxic while just as effective in treating tumors and viruses.

It has now surprisingly been found that the calcium salts of either the broad copolymer mixtures as, for example, disclosed in U.S. Pat. No. 3,224,943 or the copolymers having a narrow molecular weight range and weight distribution of U.S. Pat. No. 3,794,622, are much less toxic than any of the alkali metal salts, ammonium salts or amine salts described previously, or any of the other alkaline earth metal salts of the copolymers. Moreover, the calcium salts of the copolymers of this invention are just as effective or more effective in antitumor and virus treatment. Accordingly, the calcium salts of the copolymers of this invention are defined in simplified terms as the calcium salts of solid, cyclic copolymers of divinyl ether and maleic anhydride, soluble in water and containing divinyl ether and maleic anhydride in a mole ratio of about 1:2.

The divinyl ether—maleic anhydride copolymers used to prepare the calcium salts of this invention can be prepared by various methods. As reported in the prior art the copolymers can be produced by copolymerizing divinyl ether and maleic anhydride in an aromatic diluent at a mole ratio of about 1:2 using a free radical initiator, e.g., benzoyl peroxide, azobis(isobutyronitrile), etc., the polymer precipitating from the solvent as it is formed. Still other methods can be used to prepare the copolymers. Such copolymers, soluble in water, having an average molecular weight of from about 2000 to about 100,000, most preferably from about 4000 to about 50,000, will be used to prepare the calcium salts. The calcium salts can be prepared either directly from the free acid or from other salts. For example, the calcium salts can be prepared directly by treating the free acid with calcium hydroxide in aqueous solution. The calcium salts can also be prepared by treating an aqueous solution of an alkali metal salt, such as the sodium salt, with calcium chloride. The percentage of carboxylic acid groups converted to the calcium salt will vary, depending upon the molecular weight of the copolymer and the aqueous solubility desired. If all carboxylic acid groups are converted to calcium salts, the copolymer may become insoluble in water. Accordingly, from about 5% to about 70%, most preferably from about 10% to about 50%, of the carboxylic acid groups will be converted to calcium salts.

The following examples are presented to illustrate the calcium salts of this invention. All parts and percentages are by weight unless indicated otherwise.

EXAMPLE 1

This example illustrates the preparation of a calcium salt of divinyl ether—maleic anhydride copolymer.

To 100 parts of distilled water is added 10 parts of a divinyl ether—maleic anhydride copolymer having a molecular weight, as determined by gel permeation chromatography (described in U.S. Pat. No. 3,794,622), of 10,000 and a narrow molecular weight distribution (Mw/Mn ratio of 2.0). The copolymer is dissolved by agitation and heating to 40° C. for 2 hours. The pH of the resulting solution is adjusted to 7.2 with 2 N sodium hydroxide. To 50 parts of the solution is slowly added 20 parts of a 10% aqueous solution of $CaCl_2$ with stirring. To this solution is added 30 parts of physiological saline solution. The final solution is referred to as the 20% calcium salt in the following examples, since approximately 20% of the carboxylic acid groups on the copolymers nave been converted to the calcium salt.

EXAMPLE 2

This example shows the safening effect of the calcium salt of the copolymer described in Example 1 as compared with the sodium salt of the same copolymer.

Three hundred and twenty ICR/Swiss mice weighing 20–28 grams are divided into 16 groups of 10 males and 10 females per group. The mice are housed (5 mice per cage) in suspended stainless steel cages and fed Purina Mouse Chow No. 5015 ad libitum. Each mouse is given a single intravenous dose of a certain amount of one of three test solutions. One test solution is the sodium salt of the copolymer described in Example 1 (where all of the carboxylic acid groups are converted to the sodium salt). The other two test solutions are of the calcium salt—one being the 20% calcium salt described in Example 1 and the other being the calcium salt of the copolymer described in Example 1, where 10% of the carboxylic acid groups are converted to the calcium salt. Each test group is examined for mortality daily over a 14-day period. The number of deaths in each group is shown in Table I.

TABLE I

| Test Solution | mg/kg[1] | Mortality within the 14-day period[2] | |
|---|---|---|---|
| | | M | F |
| sodium salt | 50 | 0/10 | 0/10 |
| | 60 | 0/10 | 0/10 |
| | 70 | 1/10 | 3/10 |
| | 80 | 8/10 | 5/10 |
| | 90 | 9/10 | 9/10 |
| | 100 | 9/10 | 9/10 |
| | 110 | 9/10 | 10/10 |
| 10% calcium salt | 55 | 0/10 | 0/10 |
| | 110 | 1/10 | 2/10 |
| | 200 | 0/10 | 1/10 |
| | 250 | 2/10 | 3/10 |
| | 275 | 7/10 | 4/10 |
| | 300 | 10/10 | 10/10 |
| 20% calcium salt | 300 | 0/10 | 0/10 |
| | 500 | 0/10 | 0/10 |
| | 750 | 0/10 | 0/10 |

[1] Doses of all test solutions are expressed as mg/kg of body weight, based on the weight of the copolymer alone.
[2] Most mortalities occurred within 15 minutes of the intravenous injection.

It can be seen that the 10% calcium salt is approximately 3-fold less toxic than the sodium salt and the 20% calcium salt is approximately 7-fold less toxic.

EXAMPLE 3

This example shows the safening effect of the calcium salt of the copolymer described in Example 1 as compared with other alkaline earth metal salts of the same copolymer.

Forty-eight ICR/Swiss mice weight between 25 and 30 grams are given a single intravenous dose of a certain amount of one of the test solutions listed in Table II below. Each of the alkaline earth metal salts is prepared exactly as the calcium salt in Example 1 except that either magnesium chloride, zinc chloride or manganese chloride is substituted for the calcium chloride on an equivalent weight basis. The mice are divided into groups of 3 males and 3 females per group. Each group is examined for mortality 15 minutes after dosing. The results are shown in Table II.

TABLE II

| Test Solution | mg/kg[1] | Mortality Sex M | F |
| --- | --- | --- | --- |
| 20% calcium salt | 125 | 0/3 | 0/3 |
| | 250 | 0/3 | 0/3 |
| | 500 | 0/3 | 0/3 |
| 20% magnesium salt | 125 | 3/3 | 3/3 |
| | 250 | 3/3 | 3/3 |
| 20% zinc salt | 125 | 3/3 | 3/3 |
| 20% manganese salt | 125 | 3/3 | 3/3 |
| | 250 | 3/3 | 3/3 |

[1]Test solutions expressed as mg/kg of body weight, based on the weight of the copolymer alone.

EXAMPLE 4

This example illustrates the effectiveness of the calcium salts of the copolymer described in Example 1 as compared with a control of saline solution and the sodium salt of the same copolymer in vascular clearance of sheep red blood cells (SRBC). The removal of sheep erythrocytes from the sera of mice is a standard test used to predict antitumor activity. The test is described in Methods in Immunology and Immunochemistry, edited by Curtis A. Williams and Merril W. Chase, Vol. 5, Chapter 25, pages 296-301 (1976), Academic Press, New York, N.Y.

Twenty ICR/Swiss male mice weighing 22 to 30 grams are divided into 4 groups of 5 mice per group. Each mouse is given a single first intravenous injection of one of four test solutions. The first test solution is merely physiological saline. The second test solution is of the sodium salt of the copolymer described in Example 1 (all carboxylic acid groups converted to sodium salt). The third test solution is of the 20% calcium salt described in Example 1. The fourth test solution is of a 40% calcium salt of the copolymer described in Example 1. Each injection, except the control (saline solution), contains 25 mg/kg of body weight based on the weight of the copolymer alone. Three days after the first injection each mouse is injected intravenously with 0.2 ml. of radiolabeled ($Cr^{51}$) sheep red blood cells. Thereafter, at 3, 5, 7, 9, 11, 13, 15 and 60 minutes, 9 microliters of blood is obtained from the tail of each mouse and the SRBC concentration determined by gamma scintillation spectrometry. The data is presented in the drawing where minutes after injection of radiolabeled SRBC are plotted against counts per minute. It can be seen from the drawing that the sodium and calcium salts are equipotent in vascular clearance of SRBC.

EXAMPLE 5

This example illustrates the safening effect of the calcium salt of a broad molecular weight distribution divinyl ether—maleic anhydride copolymer as compared with the sodium salt of the same copolymer.

The calcium salt of a divinyl ether—maleic anhydride having a molecular weight, as determined by gel permeation chromatography, of 32,000, a broad molecular weight distribution (Mw/Mn ratio of 7.2), and 43% of its carboxylic acid groups converted to the calcium salt (prepared by treatment of the free acid with calcium hydroxide) is dissolved in physiological saline. Fifty ICR/Swiss mice as described in Example 2 are divided into 5 groups of 5 males and 5 females per group. Each mouse is given a single intravenous dose of a certain amount of one or two test solutions. One test solution is the 43% calcium salt of the broad molecular weight distribution copolymer described above and the other test solution is the sodium salt of the same copolymer (all of the carboxylic acid groups converted to the sodium salt). Each test group is examined for mortality daily over a 14 day period. The number of deaths in each group is shown in Table III.

TABLE III

| Test Solution | mg/kg[1] | Mortality Within 14 Days Sex M | F |
| --- | --- | --- | --- |
| 43% calcium salt | 62.4 | 0/5 | 0/5 |
| | 125 | 0/5 | 0/5 |
| | 250 | 0/5 | 1/5 |
| | 500 | 2/5 | 3/5 |
| Sodium salt | 125 | 5/5 | 5/5 |

[1]Doses of all test solutions are expressed as mg/kg of body weight, based on the weight of the copolymer alone.

It can be seen that the sodium salt is about 5-fold more toxic than the calcium salt of the same copolymer.

EXAMPLE 6

This example illustrates the effectiveness of the 43% calcium salt described in Example 5 as compared with the sodium salt (all carboxylic acid groups converted to sodium salt) of the same copolymer in three different standard experimental tumor models of the National Cancer Institute in mice. The results of the experiments are shown in Table IV. The data are averages of at least two tests at the respective dose levels.

TABLE IV

ANTI-TUMOR ACTIVITY OF CALCIUM AND SODIUM SALTS OF THE COPOLYMER IN MICE

| Tumor | Dosage[1] | Treated/Control (Median Survival Time) % 43% Ca Salt | Na Salt |
| --- | --- | --- | --- |
| B16 Melano-Carcinoma | 400 | 135 | 154 |
| | 200 | 155 | 129 |
| | 100 | 165 | 142 |
| | 50 | 159 | 149 |
| | 25 | 164 | 154 |
| | 12.5 | 144 | 146 |
| Colon 26 | 400 | 227 | 131 |
| | 200 | 298 | 199 |
| | 100 | 275 | 245 |
| | 50 | 268 | 300 |
| | 25 | 223 | 266 |
| | 12.5 | 210 | 218 |

TABLE IV-continued

ANTI-TUMOR ACTIVITY OF CALCIUM AND SODIUM SALTS OF THE COPOLYMER IN MICE

| Tumor | Dosage[1] | Treated/Control (Median Survival Time) % | |
|---|---|---|---|
| | | 43% Ca Salt | Na Salt |
| Madison Lung | 400 | 196 | — |
| | 320 | — | 133 |
| | 200 | 151 | 117 |
| | 100 | 141 | 132 |
| | 50 | 123 | 136 |
| | 25 | 122 | 128 |
| | 12.5 | 112 | 125 |

[1]Doses were given intraperitoneally and are expressed as mg/kg of body weight.

What I claim and desire to protect by Letters Patent is:

1. The calcium salt of a solid, cyclic copolymer of divinyl ether and maleic anhydride, soluble in water and containing divinyl ether and meleic anhydride in a mole ratio of about 1:2.

2. The calcium salt of claim 1 where the solid cyclic copolymer has a molecular weight, as determined by gel permeation chromatography, of from about 2000 to about 100,000 and from about 5% to about 70% of its carboxylic acid groups are converted to the calcium salt.

* * * * *